United States Patent
Yoshino et al.

(10) Patent No.: US 11,958,968 B2
(45) Date of Patent: Apr. 16, 2024

(54) THERMALLY CONDUCTIVE MATERIAL TECHNICAL FIELD

(71) Applicant: Kitagawa Industries Co., Ltd., Inazawa (JP)

(72) Inventors: Hiroto Yoshino, Kasugai (JP); Teruaki Yuoka, Kasugai (JP)

(73) Assignee: Kitagawa Industries Co., Ltd., Aichi (JP)

( * ) Notice: Subject to any disclaimer, the term of this patent is extended or adjusted under 35 U.S.C. 154(b) by 568 days.

(21) Appl. No.: 17/291,600

(22) PCT Filed: Nov. 1, 2019

(86) PCT No.: PCT/JP2019/043154
§ 371 (c)(1),
(2) Date: May 5, 2021

(87) PCT Pub. No.: WO2020/095858
PCT Pub. Date: May 14, 2020

(65) Prior Publication Data
US 2022/0017740 A1    Jan. 20, 2022

(30) Foreign Application Priority Data
Nov. 5, 2018 (JP) ................................. 2018-208230

(51) Int. Cl.
| | | |
|---|---|---|
| C08L 35/02 | (2006.01) | |
| C08K 3/22 | (2006.01) | |
| C08K 3/26 | (2006.01) | |
| C08K 5/12 | (2006.01) | |
| C08L 33/14 | (2006.01) | |
| C09K 5/14 | (2006.01) | |

(52) U.S. Cl.
CPC ................ *C08L 35/02* (2013.01); *C08K 3/22* (2013.01); *C08K 3/26* (2013.01); *C08K 5/12* (2013.01); *C08L 33/14* (2013.01); *C08K 2003/2227* (2013.01); *C08K 2003/265* (2013.01); *C08K 2201/001* (2013.01); *C08K 2201/005* (2013.01); *C08K 2201/011* (2013.01); *C08L 2205/03* (2013.01); *C09K 5/14* (2013.01)

(58) Field of Classification Search
CPC ...... C08K 2201/001; C08K 2201/0005; C08K 2003/2217; C08K 2003/222; C08K 2003/2224; C08K 2003/2227; C08K 3/22; C08K 3/26; C08K 3/262; C08K 3/267; C08K 2003/265; C09K 5/08; C09K 5/14
See application file for complete search history.

(56) References Cited

U.S. PATENT DOCUMENTS

| | | | |
|---|---|---|---|
| 7,208,192 B2 | 4/2007 | Bunyan | |
| 2020/0140724 A1* | 5/2020 | Hermans | ................. C08K 5/37 |

FOREIGN PATENT DOCUMENTS

| | | |
|---|---|---|
| JP | 2004-345932 A | 12/2004 |
| JP | 2010-242022 | 10/2010 |
| JP | 2015-140395 | 8/2015 |
| JP | 2016-188297 A | 11/2016 |
| WO | WO-2018069512 A1 * | 4/2018 ................ C08F 2/38 |

* cited by examiner

*Primary Examiner* — Christopher M Rodd
(74) *Attorney, Agent, or Firm* — Thorpe North & Western

(57) ABSTRACT

A thermally conductive material according to the present technology includes: 100 parts by mass of a crosslinking reaction product of an acrylic polymer (A) including at least two crosslinkable functional groups containing a carbon-carbon unsaturated bond and an acrylic polymer (B) including at least one of the crosslinkable functional groups; from 100 to 200 parts by mass of an acrylic polymer (C) with a viscosity of 650 mPa·s or less; from 150 to 350 parts by mass of a trimellitate ester plasticizer; from 3500 to 7500 parts by mass of a thermally conductive filler with an average particle size ranging from 0.1 μm to 100 μm; and from 50 to 300 parts by mass of a thickener with an average particle size of 50 nm or less.

8 Claims, 1 Drawing Sheet

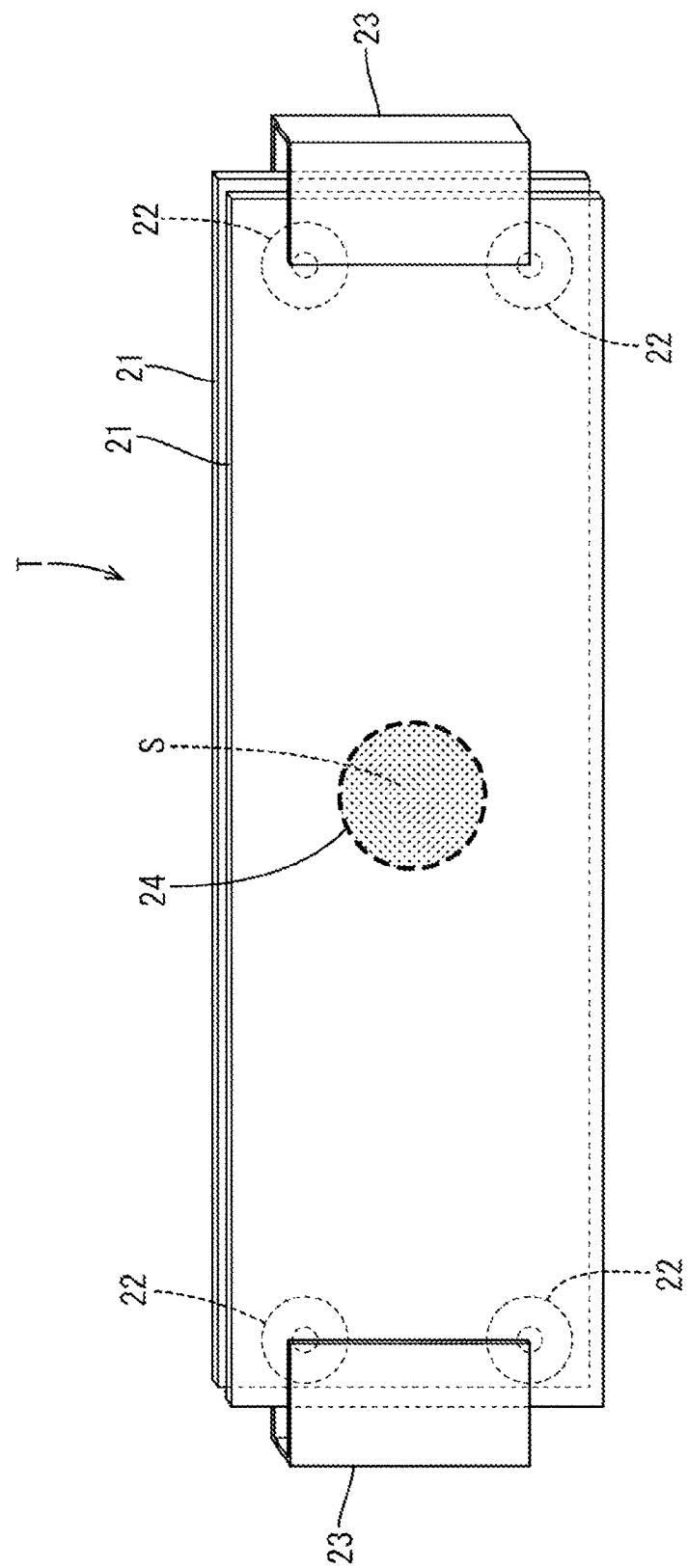

THERMALLY CONDUCTIVE MATERIAL TECHNICAL FIELD

TECHNICAL FIELD

The present technology relates to a thermally conductive material.

BACKGROUND ART

A known grease-like thermally conductive material is used to fill in small gaps or the like formed between a heat generating body and a heat dissipating body (see Japan Unexamined Patent Publication Nos. 2015-140395 and 2010-242022 and U.S. Pat. No. 7,208,192, for example). Grease-like thermally conductive materials become widely used in recent years due to their excellent adhesion and the great flexibility they provide in terms of being able to fill gaps of a variety of sizes and shapes.

This type of thermally conductive material mainly includes a resin component as a base material and a thermally conductive filler disperse therein. Note that in thermally conductive materials, silicone resin is often used as the resin component to give the thermally conductive material the required heat resistance (for example, 100° C. or greater).

Thermally conductive materials made using a silicone resin are problematic as they may produce a siloxane gas (for example, a cyclic siloxane gas). Because siloxane gas causes problems such as contact failure in an electronic apparatus, there is a demand for a thermally conductive material including a non-silicone resin that does not produce a siloxane gas.

However, known thermally conductive materials including a non-silicone resin have insufficient heat resistance and thus have room for improvement.

SUMMARY

The present technology provides a grease-like thermally conductive material that includes a non-silicone resin and has excellent heat resistance.

1. A thermally conductive material includes:
   100 parts by mass of a crosslinking reaction product of an acrylic polymer (A) including at least two crosslinkable functional groups containing a carbon-carbon unsaturated bond and an acrylic polymer (B) including at least one of the crosslinkable functional groups;
   from 100 to 200 parts by mass of an acrylic polymer (C) with a viscosity of 650 mPa·s or less;
   from 150 to 350 parts by mass of a trimellitate ester plasticizer; from 3500 to 7500 parts by mass of a thermally conductive filler with an average particle size ranging from 0.1 µm to 100 µm; and
   from 50 to 300 parts by mass of a thickener with an average particle size of 50 nm or less.
2. The thermally conductive material according to 1, wherein the thermally conductive filler includes aluminum oxide.
3. The thermally conductive material according to 1 or 2, wherein the thickener is calcium carbonate.
4. The thermally conductive material according to any one of 1 to 3, wherein a ratio (mass ratio: Y/X) of a blended amount Y of the acrylic polymer (B) to a blended amount X of the acrylic polymer (A) is from 9 to 49.

According to the present technology, a grease-like thermally conductive material that includes a non-silicone resin and has excellent heat resistance is provided.

BRIEF DESCRIPTION OF DRAWINGS

The Drawing is an explanatory diagram of a test piece used in shear resistance evaluation.

DETAILED DESCRIPTION

Thermally Conductive Material

The thermally conductive material of the present embodiment is grease-like and used by being interposed between two objects (for example, a heat generating body and a heat dissipating body). The thermally conductive material has a viscosity that allows it to be discharged using a dispenser, but does not sag and retains its shape after application.

The thermally conductive material mainly includes a crosslinking reaction product of an acrylic polymer (A) and an acrylic polymer (B), an acrylic polymer (C), a trimellitate ester plasticizer, a thermally conductive filler, and a thickener.

The acrylic polymer (A) is an acrylic polymer that is a liquid (syrup-like) at room temperature and is used as the base material of the thermally conductive material. The acrylic polymer (A) includes at least two crosslinkable functional groups containing a carbon-carbon unsaturated bond. The acrylic polymer (A) preferably includes the crosslinkable functional groups at both ends.

The viscosity (at 25° C.) of the acrylic polymer (A) is not particularly limited as long as the present technology is not impaired. However, the viscosity is preferably from 100000 mPa·s to 200000 mPa·s and more preferably from 120000 mPa·s to 180000 mPa·s, for example.

The main chain of the acrylic polymer (A) is, for example, composed of a polymer of a (meth)acrylic acid monomer described below or a polymer of a (meth)acrylic acid monomer and another vinyl monomer. In the present specification, "(meth)acrylic" means that it includes both acryl and methacryl.

Examples of the (meth)acrylic acid monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, isononyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, octadecyl (meth)acrylate, glycidyl (meth)acrylate, 2-aminoethyl (meth)acrylate, γ-(methacryloyloxypropyl) trimethoxysilane, ethylene oxide adduct of (meth)acrylic acid, trifluoromethylmethyl (meth)acrylate, 2-trifluoromethylethyl (meth)acrylate, perfluoroethyl methyl (meth)acrylate, 2-perfluoroethyl ethyl (meth)acrylate, perfluoroethyl perfluorobutyl methyl (meth)acrylate, 2-perfluoroethyl-2-perfluorobutyl ethyl (meth)acrylate, perfluoroethyl (meth)acrylate, perfluoromethyl (meth)acrylate, diperfluoromethyl methyl (meth)acrylate, 2,2-diperfluoromethylethyl (meth)acrylate, perfluoromethylperfluoroethylmethyl (meth)acrylate, 2-perfluoromethyl-2-perfluoroethylethyl (meth)acrylate, 2-perfluorohexylmethyl (meth)acrylate, 2-perfluorohexylethyl (meth)acrylate, (2-perfluorodecylmethyl (meth)acrylate, 2-perfluorodecylethyl (meth)acrylate, 2-perfluorohexadecylmethyl (meth)acrylate, and 2-perfluorohexadecylethyl (meth)acrylate. These may be used alone or in combination of two or more of them.

Examples of the other vinyl monomer include aromatic vinyl monomers such as styrene, vinyl toluene, α-methylstyrene, chlorostyrene, styrene sulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, monoalkyl and dialkyl esters of maleic acid; fumaric acid, monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, and allyl alcohol. These may be used alone or in combination of two or more of them.

The method for synthesizing the main chain of the acrylic polymer (A) is not particularly limited as long as the present technology is not impaired. For example, a free radical polymerization method may be used, but a living radical polymerization method is preferable because it easily reduces the molecular weight distribution (the ratio (Mw/Mn) of the weight average molecular weight (Mw) to the number average molecular weight (Mn)). The living radical polymerization method (particularly the atom transfer radical polymerization method) is preferable because it can obtain a polymer having a narrow molecular weight distribution and a low viscosity and because it can introduce a monomer having a specific functional group to almost any position in a polymer.

The crosslinkable functional group includes a structure containing at least a carbon-carbon unsaturated bond and is composed of, for example, the structure (functional group) represented by the chemical formula (1) below:

—OC(O)C(R)=CH2     (1)

where R represents a hydrogen atom or an organic group having from 1 to 20 carbon atoms.

The structure (functional group) represented by the chemical formula (1) is preferably, for example, an acryloyl group or a methacryloyl group and is particularly preferably an acryloyl group.

The glass transition temperature of the acrylic polymer (A) is preferably −40° C. or less and more preferably −45° C. or less.

The acrylic polymer (B) is an acrylic polymer that is used (used in combination with) the acrylic polymer (A) as the base material (base resin) of the thermally conductive material and includes at least one crosslinkable functional group containing a carbon-carbon unsaturated bond. The acrylic polymer (B) preferably includes the crosslinkable functional group at one end. Note that the acrylic polymer (B) preferably has a lower viscosity and a smaller molecular weight (weight average molecular weight and number average molecular weight) than those of the acrylic polymer (A).

The acrylic polymer (B) is a liquid (syrup-like) at room temperature and more often used as the base material (base resin) of a thermally conductive material than the acrylic polymer (A). The viscosity (at 25° C.) of the acrylic polymer (B) is not particularly limited as long as the present technology is not impaired. However, the viscosity is preferably from 35000 mPa·s to 60000 mPa·s and more preferably from 40000 mPa·s to 50000 mPa·s, for example.

For example, in the thermally conductive material, the ratio (mass ratio: Y/X) of a blended amount Y of the acrylic polymer (B) to a blended amount X of the acrylic polymer (A) is preferably 9 or greater, more preferably 12 or greater and preferably 49 or less and more preferably 30 or less.

The main chain of the acrylic polymer (B) is basically, similar to that of the acrylic polymer (A) and is composed of a polymer of the (meth)acrylic acid monomer or a polymer of the (meth)acrylic acid monomer and the other vinyl monomer. The method for synthesizing the main chain of the acrylic polymer (B) is basically the same as that for the main chain of the acrylic polymer (A). However, the main chain of the acrylic polymer (B) is preferably shorter (molecular weight is less) than the acrylic polymer (B).

The content of the crosslinkable functional group contained in the acrylic polymer (B) is similar to that of the acrylic polymer (A). The crosslinkable functional group of the acrylic polymer (B) includes a structure containing at least a carbon-carbon unsaturated bond and is composed of, for example, the structure (functional group) represented by the chemical formula (1). For the crosslinkable functional group of the acrylic polymer (B) also, the structure (functional group) represented by the chemical formula (1) is preferably, for example, an acryloyl group or a methacryloyl group and is particularly preferably an acryloyl group.

The glass transition temperature of the acrylic polymer (B) is preferably approximately the same as the glass transition temperature of the acrylic polymer (A) and is specifically preferably −40° C. or less and more preferably −45° C. or less.

When a crosslinking (polymerizing) reaction occurs between the acrylic polymer (A) and the acrylic polymer (B), the liquid acrylic polymer (C) with a viscosity of 650 mPa·s or less (at 25° C.) is preferably further added. The mixture (composition) of the acrylic polymer (A), the acrylic polymer (B), and the acrylic polymer (C) is a liquid (syrup-like) having fluidity.

The acrylic polymer (C) is preferably a polymer with no functionality that does not react and crosslink with the acrylic polymer (A) and the acrylic polymer (B). Also, the acrylic polymer (C) is preferably miscible with the acrylic polymer (A) and the acrylic polymer (B), being able to homogeneously mix with these.

The viscosity (at 25° C.) of the acrylic polymer (C) is preferably less than the viscosity of the acrylic polymer (A) and the viscosity of the acrylic polymer (B). Specifically, the viscosity (at 25° C.) of the acrylic polymer (C) is 650 mPa·s or less, preferably 600 mPa·s or less, and more preferably 550 mPa·s or less. The acrylic polymer (C) with viscosity in this range is easily homogeneously mixed with the acrylic polymer (A) and the acrylic polymer (B).

The acrylic polymer (C) preferably has a lower glass transition temperature than the acrylic polymer (A) and the acrylic polymer (B), the glass transition temperature being preferably −55° C. or less, more preferably −65° C. or less, and even more preferably −75° C. or less, for example.

The blended amount of the acrylic polymer (C) is from 100 parts by mass to 200 parts by mass per 100 parts by mass of the total blended amount of the acrylic polymer (A) and the acrylic polymer (B).

A polymerization initiator (crosslinking initiator) is used when reacting and crosslinking the acrylic polymer (A) and the acrylic polymer (B). The polymerization initiator generates radicals by receiving heat or light and mainly has a function of reacting the crosslinkable functional group of the acrylic polymer (A) and the crosslinkable functional group of the acrylic polymer (B). When radicals are generated by the crosslinking initiator, the crosslinkable functional groups are bonded (polymerized) and the acrylic polymer (A) and the acrylic polymer (B) are crosslinked and the acrylic polymers (B) are crosslinked.

Examples of the polymerization initiator include organic peroxides such as ketone peroxides, diacyl peroxides, hydroperoxides, dialkyl peroxides, peroxyketals, alkyl peresters, and percarbonates. Among these, percarbonates are particularly preferable.

The polymerization initiator may be a photoreactive type that generate radicals by receiving light (for example, ultraviolet light) or a thermally reactive type that generates radicals by receiving heat. Note that, in a case where a thermally conductive filler or the like is added to the composition including the acrylic polymer (A), the acrylic polymer (B), and the acrylic polymer (C), the thermally conductive filler is included in the thermally conductive material. Thus, light for activating the polymerization initiator may be blocked. For this reason, a thermally reactive type of crosslinking initiator is preferably used.

Note that in a case where a thermally reactive type of polymerization initiator, the reaction temperature is not particularly limited as long as the present technology is not hindered. For example, from the perspective of ensuring storage stability of the composition, a polymerization initiator with a reaction temperature (heating temperature) of 100° C. or greater is preferably used.

The blended amount of the polymerization initiator is not particularly limited as long as the present technology is not hindered. However, for example, the blended amount is preferably 0.035 parts by mass or greater per 100 parts by mass of the total of the acrylic polymer (A) and the acrylic polymer (B). Note that the upper limit of the blended amount of the polymerization initiation is, per 100 parts by mass of the total described above, preferably 0.1 parts by mass or less, more preferably 0.08 parts by mass or less, and even more preferably 0.065 parts by mass. With the blended amount of the polymerization initiation set in such a range, heat resistance (shear resistance) of the thermally conductive material is easily ensured.

Note that a silane coupling agent may be further added to the composition including the acrylic polymer (A), the acrylic polymer (B), and the acrylic polymer (C) to adjust the viscosity or the like.

The blended amount of the silane coupling agent is, per 100 parts by mass of the total of the acrylic polymer (A) and the acrylic polymer (B), 100 parts by mass or less and preferably 50 parts by mass or less, for example.

Examples of the trimellitate ester plasticizer include, for example, trioctyl trimellitate, triisononyl trimellitate, triisodecyl trimellitate, and 2-ethylhexyl trimellitate. These may be used alone or in combination of two or more of them. An example of a commercially available product able to be used as the trimellitate ester plasticizer includes the trade name "ADK CIZER® C-880" (available from Adeka Corporation).

The blended amount of the trimellitate ester plasticizer is from 150 parts by mass to 350 parts by mass per 100 parts by mass of the total of the acrylic polymer (A) and the acrylic polymer (B).

Examples of the thermally conductive filler include silicon carbide, alumina (aluminum oxide), silica, silicon nitride, and boron nitride. Other examples include surface metal-coated particles composed of cores coated with a metal, the cores being made of hollow particles (for example, glass balloons) or of resin particles. One type of thermally conductive filler may be used, or a plurality of types may be used in combination. From among these, alumina (aluminum oxide) is preferably used.

The average particle size of the thermally conductive filler is not particularly limited as long as the present technology is not impaired and may be, for example, from 0.1 μm to 100 μm. A plurality of thermally conductive fillers with different particle sizes may be used. By using a thermally conductive filler with an average particle size of 100 μm or less in a certain ratio, the stretchiness of the thermally conductive material can be ensured. Also, by using a thermally conductive filler with an average particle size ranging from 0.1 μm to 1 μm in a certain ratio, the viscosity of the thermally conductive material can be prevented from being too high.

Note that the average particle size of the thermally conductive filler is a volume-based average particle size (D50) obtained by a laser diffraction method. The average particle size can be measured by a laser diffraction type particle size distribution measurement instrument. Note that the average particle size of the other particles described below is also a volume-based average particle size (D50) obtained by a laser diffraction method.

The blended amount of the thermally conductive filler is from 3500 parts by mass to 7500 parts by mass per 100 parts by mass of the total of the acrylic polymer (A) and the acrylic polymer (B). For example, a thermally conductive filler with an average particle size ranging from 0.1 μm to 0.5 μm, a thermally conductive filler with an average particle size ranging from 1 μm to 5 μm, a thermally conductive filler with an average particle size ranging from 10 μm to 20 μm, and a thermally conductive filler with an average particle size ranging from 30 μm to 50 μm may be used in combination. In this case, regarding the overall blended amount of the thermally conductive filler, the blended amount of the thermally conductive filler with an average particle size ranging from 0.1 μm to 0.5 μm is preferably from 5 to 10 mass %, the blended amount of the thermally conductive filler with an average particle size ranging from 1 μm to 5 μm is preferably from 20 to 30 mass %, the blended amount of the thermally conductive filler with an average particle size ranging from 10 μm to 20 μm is preferably from 25 to 35 mass %, and the blended amount of the thermally conductive filler with an average particle size ranging from 30 μm to 50 μm is preferably from 30 to 40 mass %.

A thickener for sag prevention, thixotropy improvement, and the like may be added to the thermally conductive material. A carbonate such as calcium carbonate is preferably used as the thickener, for example. The average particle size of the thickener is preferably 50 nm or less, for example. The blended amount of the thickener ranges from 50 parts by mass to 300 parts by mass per 100 parts by mass of the total of the acrylic polymer (A) and the acrylic polymer (B). Note that in a case where the thickener is made of a carbonate, the surface may be coated in fatty acid. In other words, a carbonate (for example, calcium carbonate) that has undergone a coating treatment using a fatty acid may be used.

The thermally conductive material may further include a metal hydroxide, an antioxidant, a coloring agent, a flame retardant, a plasticizer, a filler, and the like.

A metal hydroxide may be added to give the thermally conductive material flame retardancy or to adjust the viscosity. An example of the metal hydroxide is magnesium hydroxide, for example. The metal hydroxide may be a metal hydroxide with a surface that has undergone a coating treatment using a higher fatty acid (surface treated metal hydroxide). Examples of the higher fatty acid include, for example, stearic acid, oleic acid, palmitic acid, linoleic acid, lauric acid, caprylic acid, behenic acid, montanic acid, and the like. Among these, oleic acid is preferable. The average particle size of the metal hydroxide is not particularly limited as long as the present technology is not impaired. However, the average particle size is preferably 0.5 µm or greater and more preferably 1 µm or greater and preferably 10 µm or less and more preferably 5 µm or less. With the average particle size of the metal hydroxide being in this range, the viscosity of the thermally conductive material can be easily set to a viscosity that allows it to be discharged from a predetermined discharge device at a relatively low pressure and that allows it to retain its shape without sagging after being discharged.

The blended amount of the metal hydroxide may range from 50 parts by mass to 500 parts by mass per 100 parts by mass of the total of the acrylic polymer (A) and the acrylic polymer (B).

Examples of the antioxidant include phenol-based antioxidants, phosphorus-based processing heat stabilizers, lactone-based processing heat stabilizers, sulfur-based heat-resistant stabilizers, phenol-phosphorus-based antioxidants, and the like. Among these, phenol-based antioxidants are preferable, and hindered phenol-based antioxidants are particularly preferable. The blended amount of the antioxidant is not particularly limited as long as the present technology is not hindered. However, for example, the blended amount may range from 0.5 parts by mass to 2 parts by mass per 100 parts by mass of the total of the acrylic polymer (A) and the acrylic polymer (B).

The composition for producing the thermally conductive material and the thermally conductive material have low viscosity and can retain a grease-like state without containing a solvent such as an organic solvent. Thus, an organic solvent is not a required component and does not need to be actively added. However, as long as the present technology is not hindered, an organic solvent may be used.

In the thermally conductive material of the present embodiment, crosslinking reaction products in which the acrylic polymer (A) and the acrylic polymer (B) are crosslinked (polymerized) and crosslinking reaction products in which the acrylic polymers (B) are crosslinked (polymerized) are included. In other words, in the thermally conductive material, the acrylic polymers are formed in a gently crosslinked structure. In the thermally conductive material, the overall crosslinking density of the acrylic polymers (the acrylic polymers (A) and (B)) can be presumed to be moderately low, and many free chains derived from mainly the acrylic polymer (B) can be presumed to be present. Also, a plasticizer, thermally conductive filler, and the like are dispersed and blended in such an acrylic polymer. This allows the thermally conductive material to have a grease-like state with moderate hardness.

The thermally conductive material has a viscosity (approximately 1000 Pa·s) that allows it to be discharged at a discharge pressure of approximately 0.2 MPa under a 25° C. temperature condition. Also, the thermal conductivity of the thermally conductive material is 2 W/m·K or greater and preferably 3 W/m·K or greater.

Since the thermally conductive material of the present embodiment includes an acrylic resin as the base resin, it does not have the problem of generating a siloxane gas, for example. Also, the thermally conductive material retains its shape after being applied via a dispenser, and sagging is minimized or prevented. Furthermore, the thermally conductive material does not have the problem of sagging from the nozzle tip of the dispenser, for example. The thermally conductive material has excellent heat resistance (shear resistance), with sagging from the installation position (for example, a gap between objects) caused by softening or the like being minimized or prevented under high temperature conditions (for example, 125° C. or greater). Also, as described below, the physical properties of the thermally conductive material do not change after a hot/cold thermal shock, and the initial state is retained.

EXAMPLES

The present technology will be described in further detail below using examples. Note that the present technology is not limited in any manner by the examples.

Examples 1 to 3

Producing the Thermally Conductive Material

The acrylic polymer (A), the acrylic polymer (B), the acrylic polymer (C), and a polymerization initiator are blended together at the blended amounts (parts by mass) indicated in Table 1. After mixing, the mixture is heated for 10 minutes at 100° C. to accelerate the crosslinking reaction (polymerization reaction). Then, with the obtained composition, a plasticizer (1), a silane coupling agent, an antioxidant, a coloring agent, aluminum oxide (1) to (5), a surface-treated magnesium hydroxide, and calcium carbonate are blended at the blended amount (parts by mass) indicated in Table 1. This is then kneaded using a kneader to produce the thermally conductive materials of Examples 1 to 3.

As the acrylic polymer (A), trade name "KANEKA XMAP RC100C" (available from Kaneka Corporation, acrylic polymer with acryloyl groups at both ends, viscosity: 160000 mPa·s (at 25° C.), specific gravity: 1.05, glass transition temperature: −50° C.) was used.

As the acrylic polymer (B), trade name "KANEKA XMAP MM110C" (available from Kaneka Corporation, reactive acrylic macromonomer with an acryloyl group at one end, viscosity: 44000 mPa·s (at 25° C.), specific gravity: 1.05, glass transition temperature: −50° C.) was used.

As the acrylic polymer (C), trade name "ARUFON® UP-1020" (available from TOAGOSEI CO., LTD., a solventless acrylic polymer with no functional groups, viscosity: 500 mPa·s (at 25° C.), weight average molecular weight: 2000, specific gravity: 1.03, glass transition temperature: −80° C.) was used.

As the polymerization initiator, trade name "PERKADOX® 16" (available from Kayaku Akzo Corporation, di-(4-tert-butylcyclohexyl) peroxydicarbonate (mixture)) was used.

As the plasticizer (1), trade name "ADK CIZER® C-880" (available from Adeka Corporation, trimellitate ester plasticizer, viscosity: 220 mPa·s (at 25° C.), glass transition temperature: −17° C.) was used.

As the silane coupling agent, trade name "KBE-502" (available from Shin-Etsu Chemical Co., Ltd., 3-methacryloxypropyl methyldiethoxysilane) was used.

As the antioxidant, trade name "AO-60" (available from ADEKA Corporation, phenolic antioxidant, pentaerythritol tetrakis [3-(3,5-di-tert-butyl-4-hydroxyphenyl) propionate]) was used.

As the coloring agent, trade name "#7403 (black)" (available from Dainichiseika Color & Chemicals Mfg. Co., Ltd.) was used.

As the aluminum oxide (1), trade name "AZ10-75" (available from NIPPON STEEL & SUMIKIN MATERIALS CO., LTD., aluminum oxide (insulation grade), spherical, average particle size: 10 μm, specific gravity: 3.8) was used.

As the aluminum oxide (2), trade name "AX3-75" (available from NIPPON STEEL & SUMIKIN MATERIALS CO., LTD., aluminum oxide, spherical, average particle size: 3 μm, specific gravity: 3.8) was used.

As the aluminum oxide (3), trade name "A10-C1" (available from Admatechs Co., Ltd., aluminum oxide, spherical, average particle size: 45 μm, specific gravity: 3.8) was used.

As the aluminum oxide (4), trade name "AC2000-SML" (available from Admatechs Co., Ltd., aluminum oxide (methacrylsilane treatment), true sphere, average particle size: 0.2 μm, specific gravity: 3.6) was used.

As the aluminum oxide (5), trade name "AX1M" (available from NIPPON STEEL & SUMIKIN MATERIALS CO., LTD., aluminum oxide, spherical, average particle size: 1 μm, specific gravity: 3.8) was used.

As the surface-treated magnesium hydroxide, trade name "MAGSEEDS N-4" (available from Konoshima Chemical Co., Ltd., particulate material of magnesium hydroxide particles surface-treated with oleic acid, average particle size: 1.3 μm, specific gravity: 2.4) was used.

As the calcium carbonate, trade name "Viscoexcel-30" (available from Shiraishi Kogyo Kaisha, Ltd., calcium carbonate (fatty acid treated), average particle size: 30 nm, specific gravity: 2.49) was used.

Comparative Example 1

A similar process to that of Example 1 was used to produce a thermally conductive material according to Comparative Example 1, except that instead of the plasticizer (1), 250 parts by mass of the plasticizer (2) was blended, and a silane coupling agent was not blended.

Note that as the plasticizer (2), trade name "SANSO CIZER® DOS" (available from New Japan Chemical co., ltd., Di-2-ethylhexyl sebacate, viscosity: 13 mPa·s (at 25° C.), weight average molecular weight: 426, glass transition temperature: −69° C.) was used.

Comparative Example 2

A similar process to that of Comparative Example 1 was used to produce a thermally conductive material according to Comparative Example 2, except that instead of the acrylic polymer (C), 150 parts by mass of an acrylic polymer (D) was blended.

Note that as the acrylic polymer (D), trade name "ACRYCURE HD-A218" (available from NIPPON SHOKUBAI CO., LTD., viscosity: 40 mPa·s (at 25° C.)) was used.

Comparative Example 3

A similar process to that of Comparative Example 1 was used to produce a thermally conductive material according to Comparative Example 3, except that instead of the acrylic polymer (C), 150 parts by mass of an acrylic polymer (E) was blended.

Note that as the acrylic polymer (E), trade name "ACTFLOW® NE-1000" (available from Soken Chemical & Engineering Co., Ltd., weight average molecular weight: 3000, viscosity: from 700 to 1300 mPa·s (at 25° C.)) was used.

Comparative Example 4

A similar process to that of Comparative Example 1 was used to produce a thermally conductive material according to Comparative Example 4, except that the blended amount of the acrylic polymer (B) was changed in 245 parts by mass, the acrylic polymer (C) and the silane coupling agent were not blended, and instead of the plasticizer (1), 250 parts by mass of the plasticizer (2) was blended.

Comparative Example 5

A similar process to that of Comparative Example 4 was used to produce a thermally conductive material according to Comparative Example 5, except that magnesium hydroxide was not blended and the blended amount of calcium carbonate was changed to 250 parts by mass.

Comparative Example 6

A similar process to that of Comparative Example 4 was used to produce a thermally conductive material according to Comparative Example 6, except that the magnesium hydroxide and the calcium carbonate were not blended.

Measurement of Discharge Amount

Thermally conductive materials according to the Examples and the Comparative Examples were discharged under a 25° C. temperature condition, a discharge pressure of 0.2 MPa, and a discharge time of 1 minute, and the discharge amount per 10 seconds (g/10 s) of the thermally conductive materials was found. The results are indicated in Table 1. Note that the devices used are as follows.

Dispenser controller: product name "SMART SHOT MS-1D" (available from Musashi Engineering, Inc.)

Syringe: product name "PSY-30E" (available from Musashi Engineering, Inc., nozzle inner diameter: 2 mm, inner diameter of portion containing thermally conductive material (i.e., chemical solution portion): 26.2 mm)

Thermal Conductivity Measurement

The thermal conductivity (W/m·K) of the thermally conductive materials according to the Examples and the Comparative Examples was measured via the hot-disk method. Note that in the measurement, a hot-disk thermal property measurement device (product name "TPS500" available from Hot Disk AB) was used. The size of the test pieces used to sandwich the polyimide sensor was 30 mm×30 mm×7 mm. The results are indicated in Table 1.

Sagging Test

The shear resistance (sagging resistance) of the thermally conductive materials according to the Examples and the Comparative Examples was evaluated using the method described below. The Drawing is an explanatory diagram of a test piece T used in the shear resistance evaluation. As illustrated in the Drawing, two glass plates (glass slides) 21 were prepared, 1 g of a thermally conductive material S was put between them with a spacer (a washer having a thickness of 1.0 mm) 22 was also interposed therebetween, and the thermally conductive material S was sandwiched between the two glass plates 21, forming it in a circular shape. The glass plates 21 were fixed together using clips 23. In order to indicate the initial position of the thermally conductive material S, the outline of the thermally conductive material S was indicated on the surface of the glass plate 21 with an oil-based marker. The test piece T thus obtained was placed in a thermal shock tester (product name "TSE-11-A", available from Espec Co., Ltd.) so that the flat circular thermally conductive material S stood upright in the vertical direction and was left for 100 hours at a temperature condition of 125° C. Thereafter, how much the thermally conductive material S sagged (displaced) from the original position (initial position) was measured, and the evaluation was determined on the basis of the evaluation criteria described below. The results are indicated in Table 1.

Evaluation Criteria

"Good" No sagging (when the amount of displacement is within 5%)

"Marginal" Slightly sagged (when the amount of displacement is less than 50%)

"Fail" Sagged (when the amount of displacement is 50% or greater)

Pump Out Test

Test pieces according to the Examples and the Comparative Examples were manufactured in a similar manner to the sagging test, except that the thickness of the spacer interposed between the two glass plates was changed to 0.5 mm and the amount of the thermally conductive material placed between the two glass plates was changed to 0.5 g. Using the thermal shock tester, the obtained test pieces were subjected to a cold/hot cycle test (number of cycles: 100) in which in a horizontal state (the glass plates being horizontal), the temperature is repeatedly alternated between −40° C. and 125° C. (30 minutes each). Thereafter, whether cracking is present in the test piece of the thermally conductive material was visually checked. The results are indicated in Table 1. Note that a case where there is no cracking is indicated by "Good", and a case where there is cracking is indicated by "Fail".

High Temperature Test

The test pieces according to the Examples and the Comparative Examples were manufactured in a similar manner to the sagging test. Using the thermal shock tester, the obtained test pieces were placed in a horizontal state (the glass plates being horizontal) and left for 500 hours in a temperature condition of 125° C. Thereafter, whether the test piece of the thermally conductive material degraded was visually checked. The results are indicated in Table 1. Note that a case where there is no degradation is indicated by "Good", and a case where there is degradation is indicated by "Fail".

TABLE 1

|  | Trade name | Example 1 | Example 2 | Example 3 |
| --- | --- | --- | --- | --- |
| Acrylic polymer (A) | RC100C | 5 | 5 | 5 |
| Acrylic polymer (B) | MM110C | 95 | 95 | 95 |
| Acrylic polymer (C) (500 mPa · s) | UP-1020 | 150 | 150 | 150 |
| Acrylic polymer (D) (40 mPa · s) | HD-A218 |  |  |  |
| Acrylic polymer (E) (700 to 1300 mPa · s) | NE-1000 |  |  |  |
| Polymerization initiator | PERKADOX16 | 0.1 | 0.1 | 0.1 |
| Plasticizer (1) | C-880 | 250 | 250 | 250 |
| Plasticizer (2) | DOS |  |  |  |
| Silane coupling agent | KBE-502 | 25 | 15 |  |
| Antioxidant | AO-60 | 5 | 5 | 5 |
| Coloring agent | #7403 | 5 | 5 | 5 |
| Aluminum oxide (1) (10 μm) | AZ10-75 | 1750 | 1750 | 1750 |
| Aluminum oxide (2) (3 μm) | AX3-75 | 1000 | 1000 | 1000 |
| Aluminum oxide (3) (45 μm) | A10-C1 | 2000 | 2000 | 2000 |
| Aluminum oxide (4) (0.2 μm) | AC2000-SML | 500 | 500 | 500 |
| Aluminum oxide (5) (1 μm) | AX1M | 500 | 500 | 500 |
| Magnesium hydroxide (1.3 μm) | N-4 | 100 | 100 | 100 |
| Calcium carbonate (30 nm) | Viscoexcel-30 | 150 | 150 | 150 |
| Discharge amount (g/10 s, 0.2 MPa) |  | 3.27 | 3.08 | 1.89 |
| Thermal conductivity (W/m · K) |  | 3.061 | 3.051 | 3.067 |
| Sagging test (125° C., 100 h) |  | Good | Good | Good |
| Pump out test (−40° C. ↔ 125° C.) |  | Good | Good | Good |
| High temperature test (125° C., 500 h) |  | Good | Good | Good |

|  | Trade name | Comparative Example 1 | Comparative Example 2 | Comparative Example 3 |
| --- | --- | --- | --- | --- |
| Acrylic polymer (A) | RC100C | 5 | 5 | 5 |
| Acrylic polymer (B) | MM110C | 95 | 95 | 95 |
| Acrylic polymer (C) (500 mPa · s) | UP-1020 | 150 |  |  |
| Acrylic polymer (D) (40 mPa · s) | HD-A218 |  | 150 |  |
| Acrylic polymer (E) (700 to 1300 mPa · s) | NE-1000 |  |  | 150 |
| Polymerization initiator | PERKADOX16 | 0.1 | 0.1 | 0.1 |
| Plasticizer (1) | C-880 |  |  |  |
| Plasticizer (2) | DOS | 250 | 250 | 250 |
| Silane coupling agent | KBE-502 |  |  |  |
| Antioxidant | AO-60 | 5 | 5 | 5 |
| Coloring agent | #7403 | 5 | 5 | 5 |

TABLE 1-continued

| | Trade name | | | |
|---|---|---|---|---|
| Aluminum oxide (1) (10 μm) | AZ10-75 | 1750 | 1750 | 1750 |
| Aluminum oxide (2) (3 μm) | AX3-75 | 1000 | 1000 | 1000 |
| Aluminum oxide (3) (45 μm) | A10-C1 | 2000 | 2000 | 2000 |
| Aluminum oxide (4) (0.2 μm) | AC2000-SML | 500 | 500 | 500 |
| Aluminum oxide (5) (1 μm) | AX1M | 500 | 500 | 500 |
| Magnesium hydroxide (1.3 μm) | N-4 | 100 | 100 | 100 |
| Calcium carbonate (30 nm) | Viscoexcel-30 | 150 | 150 | 150 |
| Discharge amount (g/10 s, 0.2 MPa) | | 2.52 | 2.63 | 2.18 |
| Thermal conductivity (W/m · K) | | 3.048 | 3.034 | 3.054 |
| Sagging test (125° C., 100 h) | | Good | Good | Good |
| Pump out test (−40° C. ↔ 125° C.) | | Good | Good | Good |
| High temperature test (125° C., 500 h) | | Fail | Fail | Fail |

| | Trade name | Comparative Example 4 | Comparative Example 5 | Comparative Example 6 |
|---|---|---|---|---|
| Acrylic polymer (A) | RC100C | 5 | 5 | 5 |
| Acrylic polymer (B) | MM110C | 245 | 245 | 245 |
| Acrylic polymer (C) (500 mPa · s) | UP-1020 | | | |
| Acrylic polymer (D) (40 mPa · s) | HD-A218 | | | |
| Acrylic polymer (E) (700 to 1300 mPa · s) | NE-1000 | | | |
| Polymerization initiator | PERKADOX16 | 0.1 | 0.1 | 0.1 |
| Plasticizer (1) | C-880 | | | |
| Plasticizer (2) | DOS | 250 | 250 | 250 |
| Silane coupling agent | KBE-502 | | | |
| Antioxidant | AO-60 | 5 | 5 | 5 |
| Coloring agent | #7403 | 5 | 5 | 5 |
| Aluminum oxide (1) (10 μm) | AZ10-75 | 1750 | 1750 | 1750 |
| Aluminum oxide (2) (3 μm) | AX3-75 | 1000 | 1000 | 1000 |
| Aluminum oxide (3) (45 μm) | A10-C1 | 2000 | 2000 | 2000 |
| Aluminum oxide (4) (0.2 μm) | AC2000-SML | 500 | 500 | 500 |
| Aluminum oxide (5) (1 μm) | AX1M | 500 | 500 | 500 |
| Magnesium hydroxide (1.3 μm) | N-4 | 100 | | |
| Calcium carbonate (30 nm) | Viscoexcel-30 | 150 | 250 | |
| Discharge amount (g/10 s, 0.2 MPa) | | 2.25 | 1.58 | 3.02 |
| Thermal conductivity (W/m · K) | | 3.057 | 3.062 | 3.045 |
| Sagging test (125° C., 100 h) | | Good | Good | Fail |
| Pump out test (−40° C. ↔ 125° C.) | | Good | Good | Good |
| High temperature test (125° C., 500 h) | | Fail | Fail | Fail |

As can be seen from Table 1, the thermally conductive materials according to Examples 1 to 3 have excellent thermal conductivity with a thermal conductivity of 3.0 W/m·K. Also, it can be seen that the thermally conductive materials of Examples 1 to 3 have excellent heat resistance. Even though the thermally conductive materials according to Examples 1 to 3 have a viscosity (fluidity) that allow them to be discharged at a relatively low pressure of 0.2 MPa, when the thermally conductive materials are used in high temperature conditions, no sagging occurs and their shape is retained.

As seen in the results of the high temperature tests, the liquid component such as the plasticizer (2) of the thermally conductive materials according to Comparative Examples 1 to 6 volatilized and was reduced, causing the thermally conductive materials to become dry and brittle. Also, in the thermally conductive materials according to Comparative Examples 1 to 6, discoloration (yellowing) occurred. In particular, in the sagging test results for Comparative Example 6, in which calcium carbonate was not added, the thermally conductive material sagged. Note that in the thermally conductive materials according to Comparative Examples 1 to 6, the plasticizer (2) that leaked to the outside melt the surrounding members (for example, members made of a plastic such as polycarbonate) when it comes into contact with them. Thus, for this reason also, the plasticizer (2) is preferably not used.

The invention claimed is:

1. A thermally conductive material, comprising:
   100 parts by mass of a crosslinking reaction product of an acrylic polymer (A) including at least two crosslinkable functional groups containing a carbon-carbon unsaturated bond and an acrylic polymer (B) including at least one of the crosslinkable functional groups;
   from 100 to 200 parts by mass of an acrylic polymer (C) with a viscosity of 650 mPa·s or less;
   from 150 to 350 parts by mass of a trimellitate ester plasticizer;
   from 3500 to 7500 parts by mass of a thermally conductive filler with an average particle size ranging from 0.1 μm to 100 μm; and
   from 50 to 300 parts by mass of a thickener with an average particle size of 50 nm or less.

2. The thermally conductive material according to claim 1, wherein the thermally conductive filler includes aluminum oxide.

3. The thermally conductive material according to claim 2, wherein the thickener is calcium carbonate.

4. The thermally conductive material according to claim 3, wherein a ratio (mass ratio: Y/X) of a blended amount Y of the acrylic polymer (B) to a blended amount X of the acrylic polymer (A) is from 9 to 49.

5. The thermally conductive material according to claim 2, wherein a ratio (mass ratio: Y/X) of a blended amount Y of the acrylic polymer (B) to a blended amount X of the acrylic polymer (A) is from 9 to 49.

6. The thermally conductive material according to claim 1, wherein the thickener is calcium carbonate.

7. The thermally conductive material according to claim 6, wherein a ratio (mass ratio: Y/X) of a blended amount Y of the acrylic polymer (B) to a blended amount X of the acrylic polymer (A) is from 9 to 49.

8. The thermally conductive material according to claim 1, wherein a ratio (mass ratio: Y/X) of a blended amount Y of the acrylic polymer (B) to a blended amount X of the acrylic polymer (A) is from 9 to 49.

* * * * *